United States Patent
Li et al.

(10) Patent No.: US 8,014,146 B2
(45) Date of Patent: Sep. 6, 2011

(54) COMPUTER SYSTEM WITH AIRFLOW BLOCKING PLATE

(75) Inventors: Yang Li, Shenzhen (CN); Shuang Fu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/730,364

(22) Filed: Mar. 24, 2010

(65) Prior Publication Data

US 2011/0141688 A1    Jun. 16, 2011

(30) Foreign Application Priority Data

Dec. 15, 2009   (CN) ...................... 2009 2 0317461 U

(51) Int. Cl.
*H05K 7/20* (2006.01)
(52) U.S. Cl. ......... 361/679.51; 361/679.47; 361/679.48; 361/679.5; 361/679.37; 361/695; 165/104.33; 165/121; 165/185; 454/184
(58) Field of Classification Search ............. 361/679.02, 361/679.33, 679.37, 679.46–51, 690–697, 361/831; 165/80.3, 104.33, 121–122, 185; 454/184; 174/16.3, 252, 35 R, 50.02; 312/223.2, 312/223.3, 236
See application file for complete search history.

(56) References Cited

U.S. PATENT DOCUMENTS

| | | | | |
|---|---|---|---|---|
| 5,166,468 A | * | 11/1992 | Atkeson | 102/207 |
| 5,224,019 A | * | 6/1993 | Wong et al. | 361/679.37 |
| 5,224,024 A | * | 6/1993 | Tu et al. | 361/831 |
| 5,287,244 A | * | 2/1994 | Hileman et al. | 361/679.47 |
| 5,600,538 A | * | 2/1997 | Xanthopoulos | 361/679.6 |
| 5,793,608 A | * | 8/1998 | Winick et al. | 361/695 |
| 5,793,610 A | * | 8/1998 | Schmitt et al. | 361/695 |
| 6,005,770 A | * | 12/1999 | Schmitt | 361/695 |
| 6,115,250 A | * | 9/2000 | Schmitt | 361/695 |
| 6,141,213 A | * | 10/2000 | Antonuccio et al. | 361/679.48 |
| 6,222,725 B1 | * | 4/2001 | Jo | 361/679.23 |
| 6,618,248 B1 | * | 9/2003 | Dalheimer | 361/679.33 |
| 6,741,459 B2 | * | 5/2004 | Imamura | 361/679.58 |
| 6,853,551 B2 | * | 2/2005 | Baar et al. | 361/679.33 |
| 6,914,779 B2 | * | 7/2005 | Askeland et al. | 361/679.51 |
| 7,167,360 B2 | * | 1/2007 | Inoue et al. | 361/679.34 |
| 7,248,472 B2 | * | 7/2007 | Vinson et al. | 361/694 |
| 7,315,447 B2 | * | 1/2008 | Inoue et al. | 361/679.48 |
| 7,394,653 B2 | * | 7/2008 | Cheng et al. | 361/679.48 |
| 7,403,387 B2 | * | 7/2008 | Pav et al. | 361/694 |
| 7,486,505 B2 | * | 2/2009 | Fushimi et al. | 361/679.08 |
| 2011/0058330 A1 | * | 3/2011 | Abraham et al. | 361/679.47 |

* cited by examiner

*Primary Examiner* — Michail V Datskovskiy
(74) *Attorney, Agent, or Firm* — Altis Law Group, Inc.

(57) ABSTRACT

A computer system includes a chassis and an airflow blocking plate. The chassis comprising a first chassis sidewall, a second chassis sidewall, and a drive bracket which is used to mount a disk drive. The drive bracket is secured in the chassis and abuts the first chassis sidewall, and the first chassis sidewall defines a first ventilation hole. The air flows into the chassis via the first ventilation hole. The airflow blocking plate secured in the chassis and located between the first chassis sidewall and the second chassis sidewall. The airflow blocking plate prevents the air from flowing back to the drive bracket.

20 Claims, 3 Drawing Sheets

COMPUTER SYSTEM WITH AIRFLOW BLOCKING PLATE

BACKGROUND

1. Technical Field

The present disclosure relates to a computer system with an airflow blocking plate.

2. Description of Related Art

Typically, a heat sink is secured to a motherboard of a computer system, to dissipate heat generated by a central processing unit (CPU). The disk drive also generates heat when working. Some heat generated from the disk drive is usually cooled by the heat dissipating component of the CPU. Air flows through a drive bracket, a system fan, some peripheral component interconnects, and a power supply bracket. However, some heated air may continue to circulate within the computer enclosure or once vented flow back into the computer system. This decreases efficiency for dissipating the heat generated by the disk drive in the computer system.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
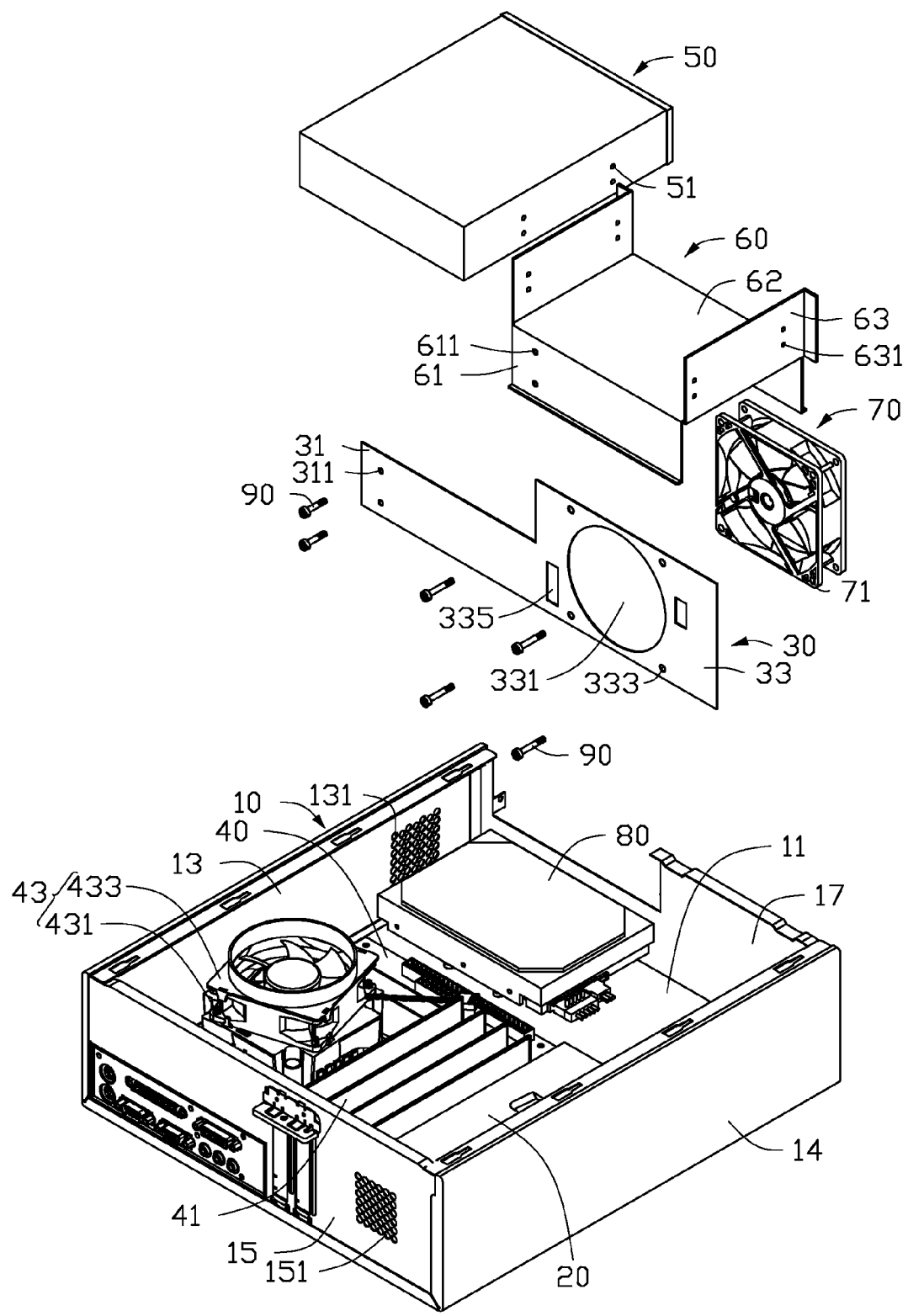
FIG. 1 is an exploded, isometric view of a computer system including a first disk drive in accordance with an embodiment.

Referring to FIG. 1, a computer system in accordance with an embodiment includes a chassis 10, a power supply bracket 20, an airflow blocking plate 30, a motherboard 40, a first disk drive 50, a drive bracket 60, a system fan 70 and a second disk drive 80. The first disk drive 50 and the second disk drive 80 can be secured in the drive bracket 60. The drive bracket 60, the motherboard 40, the airflow blocking plate 30, and the power supply bracket 20 can be secured in the chassis 10.

The chassis 10 can have any geometric shape, configuration, or orientation suitable for housing an electronic device therein. For simplicity and as an aid to the description, the chassis 10 is depicted as a cuboid (i.e., a partially or completely enclosed rectangular box) will be described herein, although other equally effective geometric shapes and configurations may exist in other exemplary embodiments. The chassis 10 includes a chassis bottom wall 11, a first chassis sidewall 13, a second chassis sidewall 14, a chassis rear wall 15, and a chassis front wall 17. In one exemplary embodiment, the chassis front wall 17 is parallel to the chassis rear wall 15 and perpendicular to the chassis bottom wall 11. The first chassis sidewall 13 is parallel to the second chassis sidewall 14 and perpendicular to the chassis bottom wall 11 and the chassis front wall 17. A plurality of first ventilation holes 131 is defined in the chassis front wall 13, and a plurality of second ventilation holes 151 is defined in the chassis rear wall 15. In one embodiment, the first ventilation holes 131 and the second ventilation holes 151 are respectively arranged in a rectangular area. The second disk drive 80 is secured on the chassis bottom wall 11 at a corner between the chassis front wall 17 and the first chassis sidewall 13.

The power supply bracket 20 is arranged at a corner between the second chassis sidewall 14 and the chassis rear wall 15.

The airflow blocking plate 30 includes a first blocking portion 31 and a second blocking portion 33 connected to the first blocking portion 31. In one embodiment, the airflow blocking plate 30 is L-shaped. Two securing holes 311 are defined in the first blocking portion 31. A through hole 331, four mounting holes 333 and an opening 335 are defined in the second blocking portion 33. The four mounting holes 333 are respectively distributed at four corners of the second blocking portion 33. Four of the six locking components 90 are respectively inserted into the four mounting holes 333 and the four holes 71 of the system fan 70 aligned with the holes 333, mounting the second blocking portion 33 to the system fan 70. The opening 335 is used for one or more cables passing through.

The motherboard 40 is mounted between the power supply bracket 20 and the first chassis sidewall 13. Four expansion cards 41 and a heat sink 43 can be mounted on the motherboard 40. The expansion cards 41 are located between the power supply bracket 20 and the heat sink 43. The heat sink 43 includes a plurality of fins 431 and a fan 433 on the fins 431.

The drive bracket 60 can be located in the chassis 10 at a corner between the first chassis sidewall 13 and the chassis front wall 17. The first ventilation holes 131 defined in the chassis front wall 13 are near the drive bracket 60. The drive bracket 60 includes a drive bracket bottom plate 62, two first drive bracket side plates 61 perpendicular to drive bracket bottom plate 62, and two second drive bracket side plates 63 perpendicular to the drive bracket bottom plate 62. In one embodiment, the two first drive bracket side plates 61 are located on two edges of the drive bracket bottom plate 62, and the two second drive bracket side plates 63 are located on other two edges of the drive bracket bottom plate 62. Two screw holes 611 are defined in each first drive bracket side plate 61. Four threaded holes 631 are defined in each second drive bracket side plate 63. Four fastening components (not shown) are inserted into the four threaded holes 631 and the four fixing holes 51 of the first disk drive 50, to secure the first disk drive 50 to each second drive bracket side plates 63.

Figure 2:
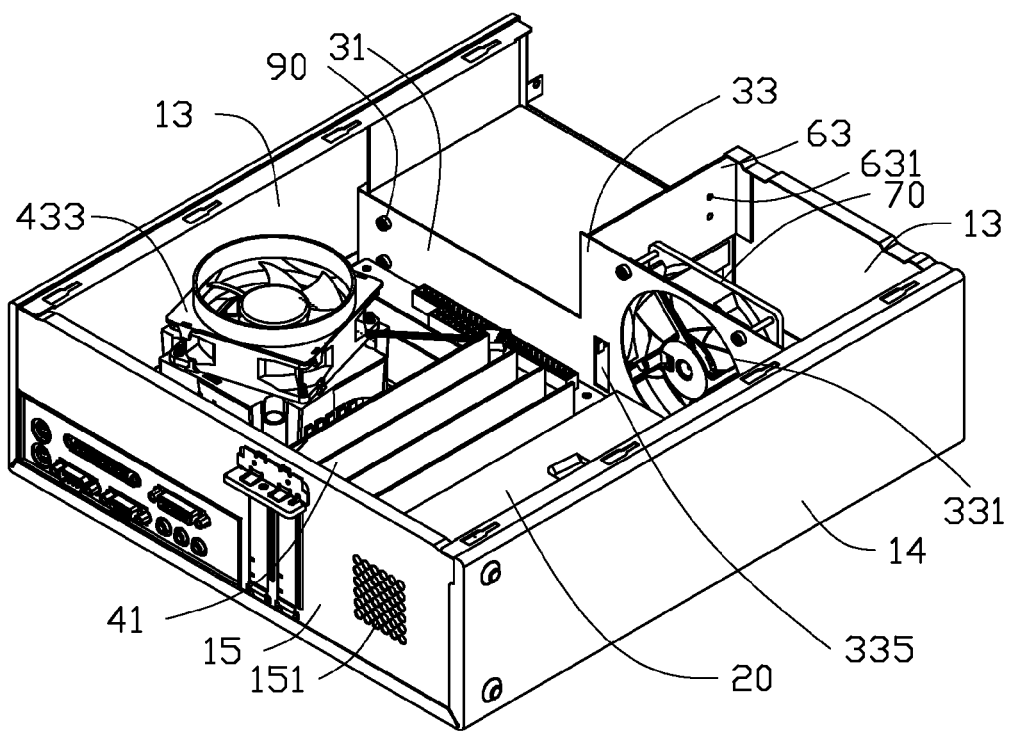
FIG. 2 is an assembled view of the computer system of FIG. 1, but without the first disk drive.
Figure 3:
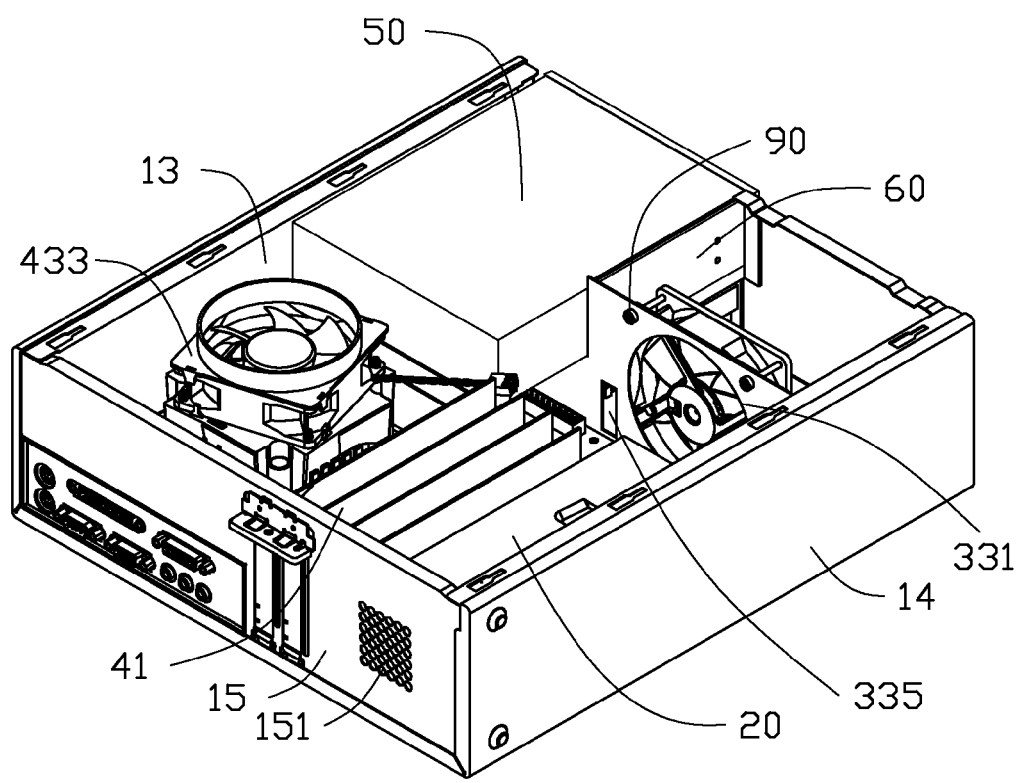
FIG. 3 is an assembled view of the computer system of FIG. 1.

Referring to FIG. 2 and FIG. 3, the system fan 70 is placed at the side of the drive bracket 60. The airflow blocking plate 30 is placed between the first chassis sidewall 13 and the second chassis sidewall 14 in the chassis 10. In this configuration the drive bracket 60 and the system fan 70 are separated from the motherboard 40 and the power supply bracket 20. The first blocking portion 31 is placed between the motherboard 40 and drive bracket 60, and the second blocking portion 33 is placed between the system fan 70 and the power supply bracket 20. Two of the six locking components 90 are inserted into the two securing holes 311 and the two screw holes 611, so that the first blocking portion 31 is mounted to the first drive bracket side plate 61. The first disk drive 50 is located between the two second drive bracket side plates 63, and screwing components, such as screws or bolts, are inserted into the threaded holes 631 and the fixing holes 51, to mount to the second drive bracket side plate 63. The four locking components 90 are locked into the mounting holes 333 and the holes 71, to mount the second blocking portion 33 to the system fan 70. Then, the second blocking portion 33 is positioned between one of the second drive bracket side plates 63 of the drive bracket 60 and the second chassis sidewall 14. The second blocking portion 33 is higher than the second drive bracket side plate 63, so the drive bracket 60 and the system fan 70 are separated from the expansion cards 41 and the power supply bracket 20 by the airflow blocking plate 30.

In use, air flows into the chassis 10 via the first ventilation holes 131 of the chassis front wall 13, through the second disk drive 80, and passes through the system fan 70 and the through hole 331 in the second blocking portion 33. Then the air flows through the expansion card 41 and the power supply bracket 20, and out of the chassis 10 via the second ventilation holes 151 in the chassis rear wall 15. With the airflow blocking plate 30, space inside the chassis 10 is divided into a first space and a second space. The second disk drive 80 and the system fan 70 are positioned in the first space, and the motherboard 40, and the power supply bracket 20 are positioned in the second space. Air flowing from the first space to the second space cannot return back to the first space, so heat generated from the second disk drive 80 can be effectively removed.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer system comprising:
   a chassis comprising a first chassis sidewall and a second chassis sidewall; a drive bracket secured in the chassis that receives a disk drive; the drive bracket abutting the first chassis sidewall; the first chassis sidewall defining a first ventilation hole; the first ventilation hole is used to supply air to the chassis;
   a drive bracket comprising a drive bracket bottom plate; a first disk drive located on a top surface of the drive bracket bottom plate, and a second disk dive located on a bottom surface of the drive bracket bottom plate; and
   an airflow blocking plate secured in the chassis and located between the first chassis sidewall and the second chassis sidewall, and the airflow blocking plate prevents the air from flowing back to the drive bracket.

2. The computer system of claim 1, wherein the airflow blocking plate is perpendicular to the first chassis sidewall.

3. The computer system of claim 1, further comprising a chassis rear wall, the airflow blocking plate is parallel to the chassis rear wall.

4. The computer system of claim 1, wherein a motherboard is placed in the chassis, the airflow blocking plate comprises a first blocking portion, and the first blocking portion is located between the motherboard and the drive bracket.

5. The computer system of claim 4, wherein the drive bracket comprises two first drive bracket side plates, the two first drive bracket side plates extend downwardly from first opposite edges of the drive bracket bottom plate.

6. The computer system of claim 5, wherein the first blocking portion is mounted to one of the two first drive bracket side plates.

7. The computer system of claim 5, wherein the drive bracket further comprises two second drive bracket side plates, and the two second drive bracket side plates extend upwardly from second opposite edge of the drive bracket bottom plate.

8. The computer system of claim 7, wherein the airflow blocking plate includes a second blocking portion, the second blocking portion located between one of the two second drive bracket side plates and the second chassis sidewall.

9. The computer system of claim 8, wherein the second blocking portion abuts the second chassis sidewall, and is taller than the one of the two second drive bracket side plates.

10. The computer system of claim 8, wherein a system fan and a power supply bracket are located in the chassis, and the power supply bracket is perpendicular to the system fan, and the second blocking portion is mounted to the system fan.

11. A computer system comprising:
    a chassis comprising a first chassis sidewall, a second chassis sidewall and a chassis rear wall; a drive bracket secured in the chassis for receiving a disk drive, the drive bracket abutting the first chassis sidewall; the first chassis sidewall defining a first ventilation hole, and the chassis rear wall defining a second ventilation hole; a system fan and a power supply bracket are mounted in the chassis, the system fan is at a side of the drive bracket, the power supply bracket is perpendicular to the system fan; air is capable of flowing into the chassis via the first ventilation hole; and
    an airflow blocking plate secured in the chassis and located between the first chassis sidewall and the second chassis sidewall, wherein the first ventilation hole, the drive bracket, the system fan, the power supply bracket and the second ventilation hole together form a path for the air to flow.

12. The computer system of claim 11, wherein the airflow blocking plate is perpendicular to the first chassis sidewall.

13. The computer system of claim 11, wherein the airflow blocking plate is parallel to the chassis rear wall.

14. The computer system of claim 11, wherein a motherboard is placed in the chassis, the airflow blocking plate comprises a first blocking portion, and the first blocking portion is located between the motherboard and the drive bracket.

15. The computer system of claim 14, wherein the drive bracket comprises a drive bracket bottom plate and two first drive bracket side plates, the two first drive bracket side plates are located on two edges of the drive bracket bottom plate.

16. The computer system of claim 15, wherein the first blocking portion is mounted to one of the two first drive bracket side plates.

17. The computer system of claim 15, wherein the drive bracket includes two second drive bracket side plates, the two second drive bracket side plates are connected to the drive bracket bottom plate.

18. The computer system of claim 17, wherein the airflow blocking plate includes a second blocking portion, the second blocking portion located between one of the two second drive bracket side plates and the second chassis sidewall.

19. The computer system of claim 18, wherein the second blocking portion abuts the second chassis sidewall and is taller than one of the two second drive bracket side plate.

20. The computer system of claim 18, wherein the system fan is placed in the chassis, the second blocking portion is mounted to the system fan.

* * * * *